United States Patent
Jensen et al.

(10) Patent No.: US 9,768,603 B2
(45) Date of Patent: Sep. 19, 2017

(54) LIGHTNING PROTECTION SYSTEM

(75) Inventors: Martin Johan Smith Jensen, Børkop (DK); Bastian Lewke, Herning (DK); Kaj Olsen, Riiskov (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 914 days.

(21) Appl. No.: 13/391,462

(22) PCT Filed: Jan. 15, 2010

(86) PCT No.: PCT/EP2010/050472
§ 371 (c)(1),
(2), (4) Date: Apr. 27, 2012

(87) PCT Pub. No.: WO2011/023415
PCT Pub. Date: Mar. 3, 2011

(65) Prior Publication Data
US 2012/0205133 A1 Aug. 16, 2012

Related U.S. Application Data

(60) Provisional application No. 61/236,192, filed on Aug. 24, 2009.

(51) Int. Cl.
*F03D 11/04* (2006.01)
*H02G 13/00* (2006.01)
(Continued)

(52) U.S. Cl.
CPC ............ *H02G 13/00* (2013.01); *E04H 12/12* (2013.01); *F03D 13/20* (2016.05); *F03D 80/30* (2016.05); *H02G 13/40* (2013.01); *Y02E 10/728* (2013.01)

(58) Field of Classification Search
CPC ........ H02G 13/00; H02G 13/40; E04H 12/12; F03D 13/10; F03D 13/20; F03D 13/22;
(Continued)

(56) References Cited

U.S. PATENT DOCUMENTS 6,176,317 B1 * 1/2001 Sepich .......................... 166/379
2003/0089074 A1 * 5/2003 Mathis ....................... 52/745.17
(Continued)

FOREIGN PATENT DOCUMENTS

DE 7858 U 9/1959
EP 0960986 A2 12/1999
(Continued)

OTHER PUBLICATIONS

JP 2009019550 English Translation, Machine Translation for Reference.*
(Continued)

*Primary Examiner* — Gregory Anderson
*Assistant Examiner* — Eldon Brockman (57) ABSTRACT

A lightning protection system for a tower of a wind turbine is provided. The tower includes a reinforced concrete tower wall in which a plurality of electrically conductive structural reinforcing elements are embedded during construction. The lightning protection system includes a plurality of the structural reinforcing elements connected in an electrically conductive manner with each other and with a ground terminal. Further, a method of incorporating such a lightning protection system in a reinforced concrete tower, and a wind turbine with such a lightning protection system is provided.

18 Claims, 6 Drawing Sheets

(51) Int. Cl.
  *E04H 12/12*   (2006.01)
  *F03D 80/30*   (2016.01)
  *F03D 13/20*   (2016.01)

(58) Field of Classification Search
  CPC ...... F03D 80/30; F03D 11/0033; Y02E 10/72; Y02E 10/727
  See application file for complete search history.

(56) References Cited

U.S. PATENT DOCUMENTS

2009/0102743 A1    4/2009  Hager
2009/0272557 A1*  11/2009  Mogensen .............. F03D 9/003
                                                                         174/2

FOREIGN PATENT DOCUMENTS

JP         8291642 A     11/1996
JP      2001227199 A      8/2001
JP      2009019550 A      1/2009

OTHER PUBLICATIONS

JP 2001227199 English Translation, Machine Translation for Reference.*

Machine Translation for Reference—English Translation of JP2009019550.
Müller, Klaus-Peter/ Dehn + Söhne; "Blitz- und Überspannungsschutz Maβnahmen für Telekommunikationsanlagen"; VDE Bezirksverein Thüringen e. V.; 200.
Wettingfeld, Jürgen; "Erdung und Potentialausgleich in Industrieanlagen"; Verband deutscher Blitzschutzfirmen e. V; Apr. 2009; S. 1-27.; 2009.
Machine Translation for Reference—English Translation of JP2001227199.
Hau Erich; "Windkraftanlagen: Grundlagen, Technik, Einsatz, Wirtschaftlichkeit"; 3. Auflage; Springer-Verlag; ISBN: 3-540-42827-5; pp. 434-439; 2003.
Verband Deutscher Blitzschutzfirmen e.V.; VDB. "Inhaltsverzeichnis" und "Entwurf and Planung einer Ableitungsanlage"; Auszug aus dem VDB Blitzschutz Montage-Handbuch; Stand Sep. 2015;; 2015;—an English translation will follow.
Verband Deutscher Blitzschutztirmen e. V. "Das VDB Blitzschutz Montage-Handbuch als PDF-Datei"; online: http:www.vdb.blitzschutz.com/mhb, Oct. 2012, pp. 1-3.
Verband Deutscher Blitzschutztirmen e. V. "Impressum" VDB-Blitzschutz Montage-Handbuch, 2009, p. 1.
DIN Deutsches Institut for Normung e. V. "Blitzschut—Teil 4: Elektrische und elektronische Systeme in baulichen Anlagen", DIN EN 62305-4, Oct. 2006, pp. 1-16.

* cited by examiner

LIGHTNING PROTECTION SYSTEM

CROSS REFERENCE TO RELATED APPLICATIONS

This application is the U.S. National Stage of International Application No. PCT/EP2010/050472 filed Jan. 15, 2010, and claims the benefit thereof. The International Application claims the benefits of U.S. Provisional Application No. 61/236,192 US filed Aug. 24, 2009. All of the applications are incorporated by reference herein in their entirety.

FIELD OF INVENTION

The invention describes a lightning protection system for a tower constructed in-situ in one piece.

BACKGROUND OF INVENTION

For any tall construction exposed to the elements, lightning protection is an important aspect. A tall construction must incorporate some way of conducting the electrical current to ground in the event of a lightning strike. In its simplest form, a lightning protection system (LPS) can comprise a lightning rod which is generally higher than the building to which it is attached, and which is connected to a metal strip or other electrical conductor leading directly down to ground. More advanced lightning protection systems comprise several conductors at extremities of the building or construction, and multiple conductive paths for guiding the electric current to ground.

Generally, the taller a construction, the more likely it is to be struck by lightning. Wind turbine towers are relatively tall constructions, often over 20 m in height, and are usually located in exposed areas such as on hilltops or offshore. Most wind turbine towers in use at the present time are constructed of steel, and the steel tower itself acts as a conductor.

However, steel towers can be costly to manufacture, since steel is becoming an increasingly expensive material. Furthermore, a steel tower must be assembled by connecting together several tower sections. Since tall towers are desired for several reasons which will be known to the skilled person, each section can be 10 m in length or more. The tower sections must be transported horizontally to the final destination where they are assembled using a crane. The transport of such long sections can be very difficult, since the roads along which they are transported cannot have any sharp turnings or low bridges. Therefore, before actually assembling a wind turbine towers in a certain location, it may be necessary to first build an access road. Obviously, this adds considerably to the overall costs.

For these reasons, it is becoming more attractive to construct wind turbine towers of an alternative material such as concrete, which is economical and easy to mix on-site. Concrete can be used in the construction of very tall buildings and towers such as television towers, and is given structural strength by the use of steel reinforcing elements such as reinforcing bars (also referred to as 'rebar') or post-tensioning cables (also referred to as 'tendons'). However, unlike a steel wind turbine tower, a concrete tower requires an additional lightning protection system, since it is absolutely mandatory to avoid damage to the concrete such as that which can arise as a result of a lightning strike, in which secondary side-flashes can cause cracks in the concrete. Such structural damage can cause the concrete to crumble in places, thus severely weakening the structure. Furthermore, lightning current from a lightning conductor of the blades and upper wind turbine structure (hub, nacelle, etc.) must be conducted to ground in order to prevent lightning damage to electrical equipment.

SUMMARY OF INVENTION

It is therefore an object of the invention to provide a lightning protection system which avoids the problems mentioned above.

The object is achieved by a lightning protection system, a method of incorporating such a lightning protection system in a reinforced concrete tower, and a wind turbine comprising such a lightning protection system as claimed in the claims.

According to the invention, a lightning protection system for a tower, which tower comprises a reinforced concrete tower wall in which a plurality of electrically conductive structural reinforcing elements are embedded during construction, comprises a plurality of the structural reinforcing elements connected in an electrically conductive manner with each other and with a ground terminal.

An obvious advantage of the invention is that, since the structural reinforcing elements are electrically connected to each other and to the ground terminal, any current arising during a lightning strike is diverted through the structural reinforcing elements in a controlled manner, so that an undesirable 'side-flash' or 'flash-over' through free space or concrete to a structural element is avoided, with the very favourable advantage that the structural stability of the concrete tower is protected from lightning damage. Also, since the electrically conducting structural elements are intentionally used to actively divert the current into the ground terminal, the lightning protection system according to the invention can be realized at a lower cost than a comparable lightning protection system realized externally to the tower wall. Furthermore, since the lightning protection system is incorporated in the concrete tower during construction, a time-consuming installation procedure after completion of the tower is not required.

The method according to the invention of incorporating a lightning protection system in a reinforced concrete tower comprises the steps of mounting climbing rods to a currently uppermost level of the tower and assembling a casting form to enclose the climbing rods. The method comprises the subsequent steps of placing additional electrically conductive structural reinforcing elements in the casting form, electrically connecting the structural reinforcing elements to a ground terminal and then pouring concrete into the casting form to embed the structural reinforcing elements.

According to the invention, such a lightning protection system is used in a reinforced concrete tower, preferably in a reinforced concrete tower of a wind turbine.

A wind turbine according to the invention comprises such a lightning protection system in a reinforced concrete tower of the wind turbine.

Particularly advantageous embodiments and features of the invention are given by the dependent claims, as revealed in the following description.

Tower structures can be constructed on-site for various different situations. For example, concrete piers for bridges may be cast on site. Concrete pylons may be constructed for carrying cable cars, etc. For various reasons, a tall tower structure such as a television tower or a wind turbine tower is usually hollow. For one, such a structure is stable. Furthermore, many types of tall towers require some mode of access to the equipment mounted on top of the tower. In the following, without restricting the invention in any way, a hollow tower is assumed, although the inventive lightning protection system could also equally well be used for a solid tower structure.

The tower can be constructed in one piece in-situ (i.e. on-site) in a number of ways. In one approach, the tower can be constructed of concrete cast in stages. An adjustable mould can be prepared for each stage and lifted into place by means of a crane, then casting the concrete into the mould, and subsequently removing the mould to perform size adjustments for the next stage. In this type of construction, the mould is held in place by attaching it to essentially vertical 'climbing rods' which protrude from a previously assembled stage. In each casting step, climbing rods are embedded for use in the subsequent casting step. In another, more efficient approach, a 'climbing platform' is used. Here, a platform is suspended from the climbing rods, a mould is constructed in place, and concrete is cast. Once the concrete has hardened or set, the platform and the mould move upwards by 'climbing up' the climbing rods (the climbing rods are sometimes also referred to as 'steering rods' or 'sliding rods'). The mould is adjusted in size, and concrete can be cast for the next stage. This approach is more economical, since the mould need not be completely detached and re-attached for each casting stage. Climbing rods may be made of construction grade steel and may have a diameter of about 3 cm. Since the climbing rods are left in place, i.e. they are embedded in the tower wall, the term 'structural reinforcing element' is also used to refer to a climbing rod in the following. While the tower could also conceivably be built using any suitable type of brick and mortar construction in which the structural elements are embedded in concrete, including the climbing rods for a construction platform, in the following it is assumed (without restricting the invention in any way) that the tower is constructed using concrete cast into form, since this is a more economical and less time-consuming approach.

As mentioned in the introduction, concrete load-bearing structures are given structural strength by the use of steel reinforcing elements such as rebar or tendons. Basically, rebar acts to hold the structure together in the event of damage, while the tendons act to preload the concrete so that it is capable of withstanding greater loads. In either case, these reinforcing elements are generally made of steel and are therefore electrically conducting. The rebar can be assembled as the tower 'grows', by connecting vertical bars and appropriately shaped horizontal bars to form a kind of grid or mesh. Of course, pre-assembled rebar 'mats' could be used. For a concrete tower with circular cross-section, the rebar is generally incorporated in two vertical 'layers', i.e. an inner layer towards the inside of the tower, and an outer layer towards the outer side of the tower. The tendons are usually located between these rebar layers.

A lightning strike to a tall structure such as a reinforced concrete tower can result in a very high current, which must be safely diverted to ground. The strength of a magnetic field arising as a result of a lightning strike can be kept to a tolerably low level within the tower by offering the lightning current more paths by which it can travel. Therefore, in a particularly preferred embodiment of the invention, the lightning protection system comprises a plurality of lightning conductors (e.g. earthing cables) embedded in the tower wall during construction and electrically connected to the plurality of structural reinforcing elements and to the ground terminal. One or more of the lightning conductors can be specifically realized to 'catch' a lightning strike so that this can be diverted down through the lightning protection system and into the ground terminal.

In order to distribute the current into the other paths of the lightning protection system according to the invention, a first lightning conductor is preferably arranged adjacent to an essentially vertical structural reinforcing element and is electrically connected to the structural reinforcing element, which structural reinforcing element comprises a climbing rod and/or a post-tensioning cable. In this way, during a lightning strike, the electrical current can be diverted through first lightning conductors as well as through the climbing rods and/or post-tensioning cables. Here, the expression 'essentially vertical' is to be interpreted as vertical or nearly vertical, since a concrete tower may be cylindrical with vertical walls; or a tower may be wider at the base and taper towards the top so that the climbing rods or a post-tensioning cables will follow this slant.

Such a first lightning conductor can be any appropriate conductor, specifically realized to present a low impedance to current, such as a metal band or cable. A suitable metal might be copper, since this is a particularly good conductor. However, any suitable metal can be used. The relevant dimensions for the lightning conductor such as cross-sectional area can be chosen according to the metal used, since a poor conductor will require a larger cross-sectional area, as will be known to the skilled person.

During a lightning strike, the electrical current seeks the fastest path to ground, and can divide through various conducting channels, whereby the current is not necessarily evenly distributed through these channels. Therefore, in a particularly preferred embodiment of the invention, a second lightning conductor of the lightning protection system comprises a horizontal lightning protection ring (also referred to in the following as an 'LP ring') embedded in the tower wall, and wherein the second lightning conductor is electrically connected to at least one structural reinforcing element and/or at least one first lightning conductor. The horizontal ring advantageously acts to provide an electrical equipotential, so that the current is more evenly distributed thereafter through the essentially vertical elements on its way to ground. Preferably, the lightning protection system comprises a plurality of such rings, embedded in the tower walls at certain discrete intervals. For example, a 100 m tower may be constructed so that 20 rings are embedded at 5 m intervals. Obviously, the number of rings to embed may depend on several factors such as the location of the tower (and the associated likelihood of the tower being struck by lightning), the height of the tower, the number of lightning conductors and structural reinforcing elements being used, etc.

A critical region in the design of a lightning protection system is at the base of the tower, where the current is directed into ground. Therefore, in a further preferred embodiment of the invention, a second lightning conductor comprises a major horizontal LP ring embedded in a lower region of the tower wall and connected to a ground terminal in a foundation of the tower, and wherein the second lightning conductor is electrically connected to at least one structural reinforcing element and/or at least one first lightning conductor The major horizontal LP ring preferably comprises at least six rings, each of which is preferably made of the same material as a first lightning conductor and preferably has at least the diameter of a first lightning conductor, and the rings are preferably connected together by means of robust mechanical clamps.

For obvious reasons, the horizontal LP rings will generally be physically separate from the vertically conducting elements. However, in order to ensure that electrical current can favourably flow between the rings and the vertical elements, these are preferably connected in an electrically conducting manner. Therefore, in a preferred embodiment of the lightning protection system according to the invention, a structural reinforcing element comprises a short radial rebar embedded essentially radially in the concrete tower wall adjacent to a number of lightning conductors and electrically connected to a first lightning conductor, a second lightning conductor and an essentially vertical structural reinforcing element. The radial rebar can be a separate structural reinforcing element. However, the radial rebar can equally well be connected to an inner and/or an outer layer of the regular rebar mesh, mat or grid described above.

During the construction procedure, first lightning conductors such as earthing cables are embedded in the concrete of the tower wall. Such a lightning conductor can comprise several colinear sections, whereby successive sections are welded or otherwise connected to each other, for example using an appropriate mechanical clamp. However, such interruptions may result in an unfavourable distribution in the downward paths of the high currents during a lightning strike, since any connection may be associated with a greater impedance. Therefore, in a particularly preferred embodiment of the invention, a first lightning conductor of the lightning protection system comprises a continuous earthing cable extending from the base of the tower (where it is connected to the ground terminal) to the top of the tower (where it can be connected to another part of the lightning protection system).

In some cases, it may be favourable to be able to connect electrical systems positioned inside the tower to the LPS embedded in the tower wall. Such electrical systems, for example generators, transformers etc. can be positioned on platforms at various levels within the tower. Therefore, in another preferred embodiment of the invention, the lightning protection system comprises a number of electrical outlets on the inside of the tower wall. These outlets can be connected in the usual manner to earthing means of such electrical systems.

The lightning protection system according to the invention is particularly suitable for embedding in a reinforced concrete tower wall of a wind turbine, which concrete tower wall is cast in-situ using a climbing platform and is realized to support a nacelle housing, a hub and a number of blades. In the event of a lightning strike, it is usually an extremity of a construction that is hit. In the case of a wind turbine, this means that one or more of the blades or the nacelle housing are most likely to be struck by lightning. Therefore, in a further preferred embodiment of the invention, the lightning protection system comprises a connection means, for example a suitable brush, for electrically connecting a lightning conductor of the lightning protection system in the tower wall to a lightning conductor of the nacelle housing, the hub and the blades. In this way, the ensuing high currents can be optimally diverted through the lightning protection system in the tower wall and into the ground terminal, thus effectively protecting the generator and any other electrical equipment in the nacelle housing from damage.

As mentioned above, a high number of paths in a lightning protection system is preferable in order to rapidly divert the current to ground. Therefore, in a preferred embodiment of the invention, the method of incorporating a lightning protection system in a reinforced concrete tower constructed on site comprises the step of also placing a number of lightning conductors in the casting form and electrically connecting the lightning conductors to the structural reinforcing elements in the casting form.

The robustness of the electrical connections between the various components of the lightning protection system according to the invention is important in ensuring an essentially even current flow during a lightning strike. In particular, robust connections between a horizontal ring and a vertical structural reinforcing element or first lightning conductor ensure that an equipotential is created at the level of the horizontal ring. Therefore, in a preferred embodiment of method according to the invention, an electrical connection between a lightning conductor and a structural reinforcing element is made by welding the lightning conductor to the structural reinforcing element and/or by mechanically clamping the lightning conductor to the structural reinforcing element by means of a clamping element, preferably a steel band. Preferably, a weld connection is made in an exothermal welding procedure. A mechanical clamp such as a steel band is preferably wrapped around both the lightning conductor and the structural reinforcing element in such a manner as to press the clamp with some force against the enclosed elements in order to provide a connection that is a good electrical conductor. Using such connections, for example, a vertical lightning conductor can be electrically connected to adjacent vertical structural reinforcing elements and/or to a horizontal LP ring. Similarly, a horizontal LP ring can be connected electrically to a number of vertical structural reinforcing elements.

Preferably, a horizontal LP ring is electrically connected to the other elements of the lightning protection system by means of structural reinforcing elements comprising short horizontal rebars arranged radially at the level of the horizontal ring, and connected to the rebar structure in the tower wall. This rebar structure can be in the form of a tapering conical grid of vertical rebars and horizontal rebar rings. The electrical connections can be made by welding or by clamping, as described above. At several points in a level of the tower wall, a 'bundle' of electrically conducting elements can be formed by connecting, for example, a vertical lightning conductor to a tendon, a short rebar, and an LP ring. Such bundles can be essentially evenly spaced in the tower wall.

Since some part of the current will be transported to ground through the climbing rods, these are preferably also constructed in order to act as good electrical conductors. However, for reasons which will be evident to the skilled person, the climbing rods will usually not be made in one piece, since these are rigid elements and a typical concrete tower such as a wind turbine tower may reach a height of 100 m or more. The climbing rods are usually made in sections, and a 'new' section is put into place above the preceding (already embedded) section before being embedded itself in the concrete. Usually, in a climbing platform construction method, the sections are colinear—i.e. in one line—so that a hydraulic jack (for suspending the construction platform) can be moved upwards along the climbing rod as the tower grows. The climbing rods can be realized, for example, as solid rods which can be welded or clamped together, as rods with threaded ends which can be screwed together, or in any other appropriate form. Therefore, in a further preferred embodiment of the invention, a pair of colinear climbing rods is connected by means of an electrical connection, which can be in the form of a clamped connection, a welded connection, or a threaded connection, as appropriate.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numbers refer to like objects throughout. Objects in the diagrams are not necessarily drawn to scale.

DETAILED DESCRIPTION OF THE EMBODIMENTS

Figure 1:
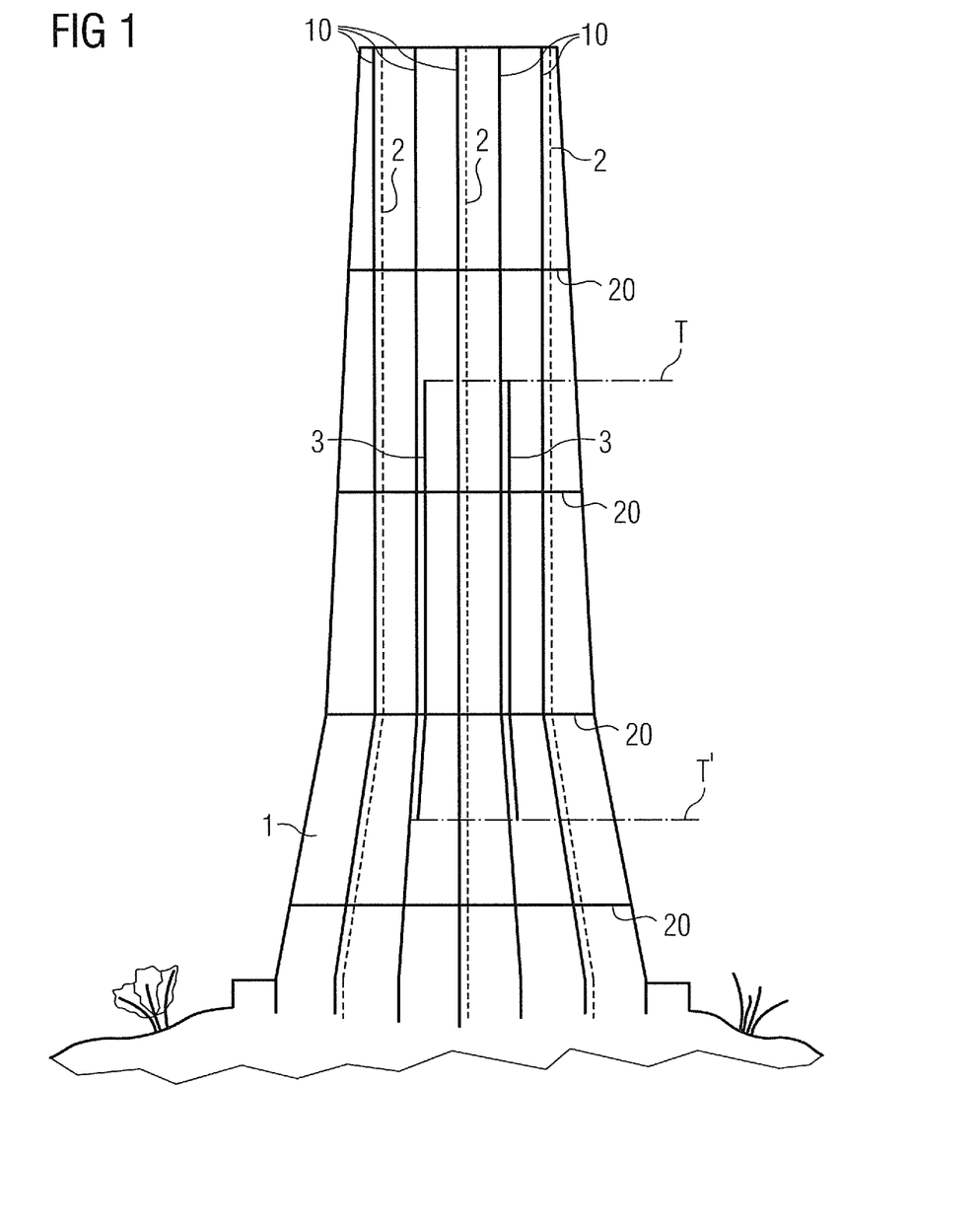
FIG. 1 shows a schematic representation of a lightning protection system according to an embodiment of the invention.

FIG. 1 shows a very simplified schematic representation of a lightning protection system 100 according to the invention incorporated in a hollow concrete tower 1. The solid lines indicate earthing cables 10 incorporated in the concrete tower wall 11. The dotted lines indicate climbing rods 2, and the shorter solid lines in the region T-T' indicate post-tensioning cables 3 or tendons 3. Typically, a tall tower structure 1 has a short lower region with a more pronounced conical shape, and a long upper region which tapers more gradually. In this embodiment, the tendons 3 are incorporated over a part of the tower height. At their base, the tendons are anchored in the tower wall. At their top, the tendons 3 are hydraulically tightened to preload the concrete tower wall. The diagram also shows a number of horizontal lightning protection rings 20 at various levels, which ensure that electrical equipotentials are achieved at all these levels. In practice, for a tower 1 with a height of 100 m and a diameter of about 5 m, about 10 climbing rods 2, 10 tendons 3, and about 10 lightning conductors 10 such as earthing cables 10 would be incorporated. Horizontal LP rings 20 can be incorporated at discrete distances, such as every 5 m using the above example.

Figure 2:
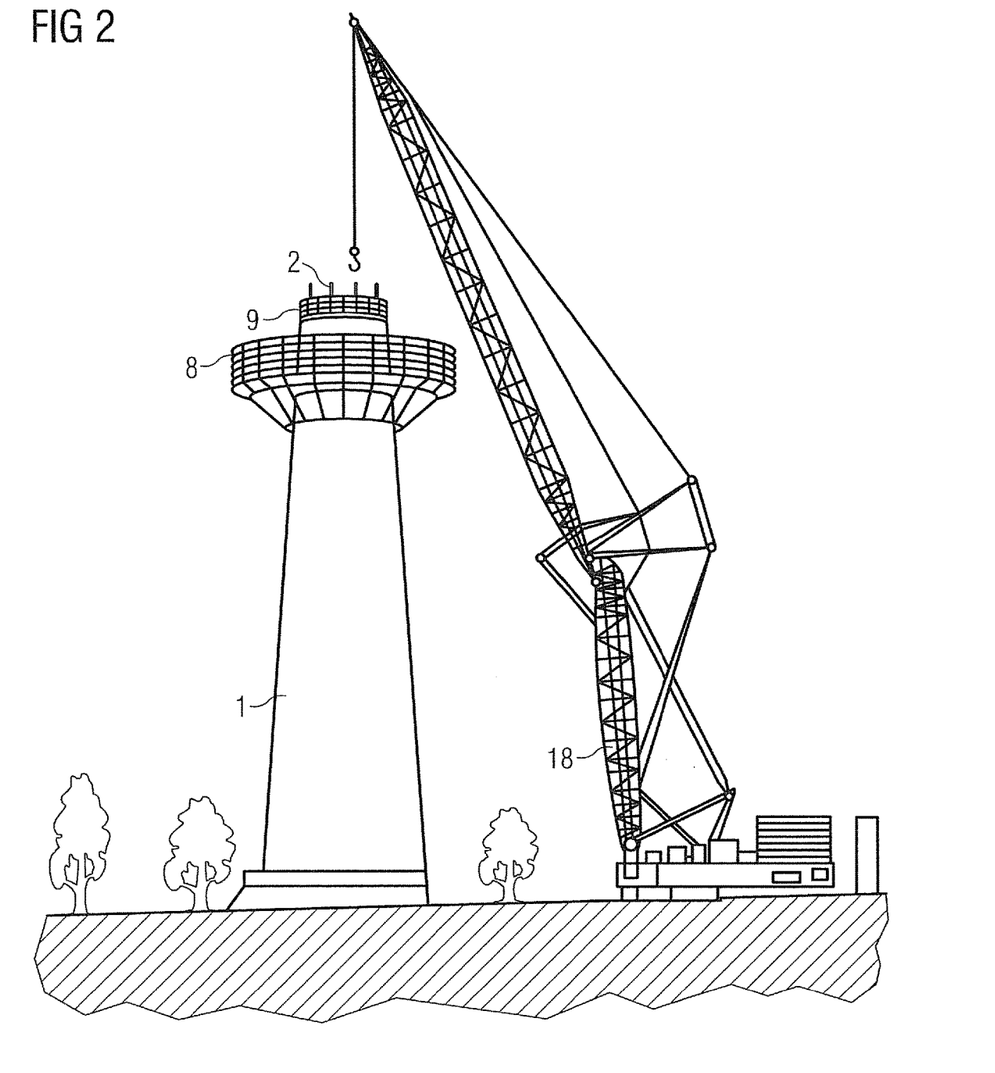
FIG. 2 shows a partially completed concrete tower which is being constructed in-situ and in one piece.

FIG. 2 shows a partially constructed concrete tower 1. Here, a climbing platform 8 is suspended from a number of climbing rods 2. The climbing platform 8 has a railing for the safety of construction workers, who can assemble a casting form 9 for the next 'layer' of concrete. The climbing platform 8 is held or suspended in place by attaching it the climbing rods 2 which are embedded in the previously cast concrete of the tower 1. This can be done by means of hydraulic jacks, which are not shown in the diagram for the sake of clarity. Reinforcing elements (again, for reasons of clarity, these are not shown in this diagram) such as reinforcing bars and tendons are assembled in place in the casting form 9. The mixed concrete is lifted by a crane 18, and the construction workers pour this concrete into the casting form 9. Once the concrete has set, the casting form 9 can be dismantled, the climbing platform 8 can be jacked up to the next level, the casting form 9 is re-assembled, climbing rods 2 are extended, and the next layer can be cast.

Figure 3:
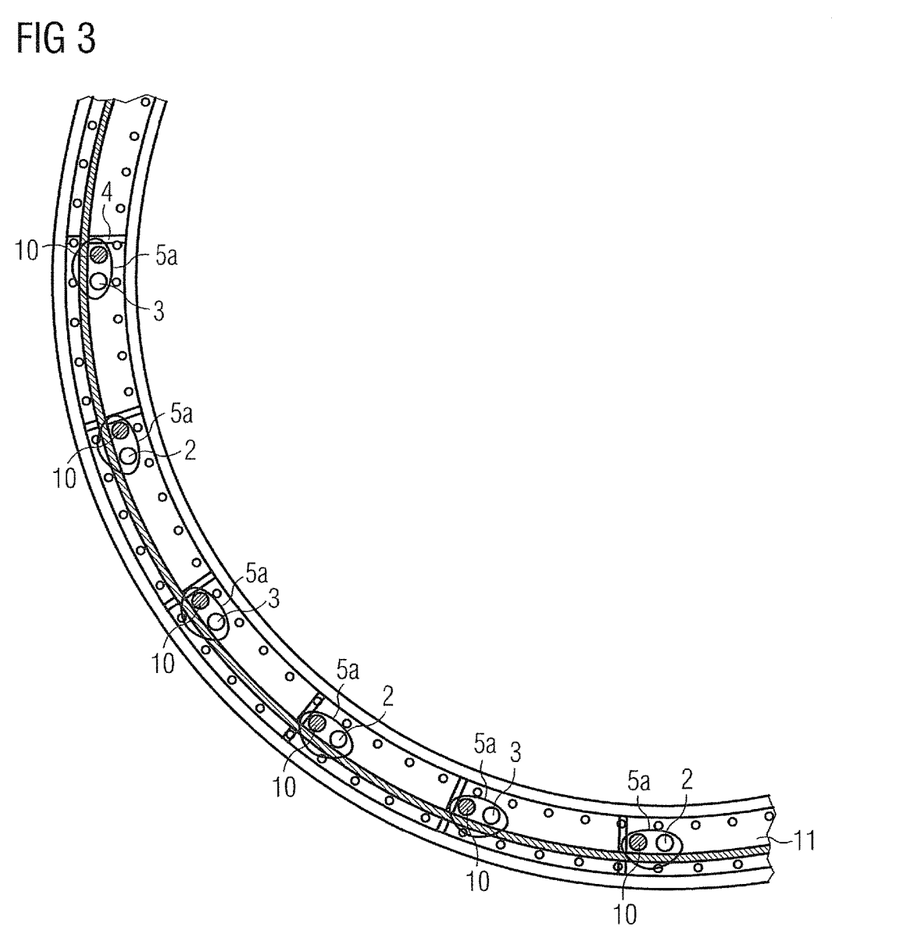
FIG. 3 shows a schematic cross-section of a concrete tower wall with elements of a lightning protection system according to an embodiment of the invention.

FIG. 3 shows a schematic cross-section of a concrete tower wall 11 with elements 2, 3, 4, 5a, 10, 20 of a lightning protection system according to the invention. In the diagram, climbing rods 2 are distributed fairly evenly throughout the wall 11. These were used in construction to attach a climbing platform. Evenly spaced between the climbing rods 2 are a plurality of tendons 3. In this embodiment, alongside each climbing rod 2 and each post-tensioning tendon 3, an earthing cable 10 is embedded in the concrete such that each earthing cable 10 is in direct proximity to a climbing rod 2 or a post-tensioning tendon 3. This cross-section is at the level at which a horizontal ring 20 is embedded in the tower wall 11. The regular rebar grid or mesh 40 is indicated by the small black dots. A short radially placed rebar 4 is used to connect the elements of the lightning protection system according to the invention to the regular rebar grid 40. To make a robust electrical connection between the earthing cables 10 and the other elements 2, 3, 4, 20, steel bands 5a are firmly wrapped around neighbouring elements, so that, for example, the horizontal ring 20, an earthing cable 10, a short rebar 4 and a climbing rod 2 are bound together with an electrically conducting steel band 5a. Such an electrical connection is made for each 'bundle' of elements around the circumference.

Figure 4:
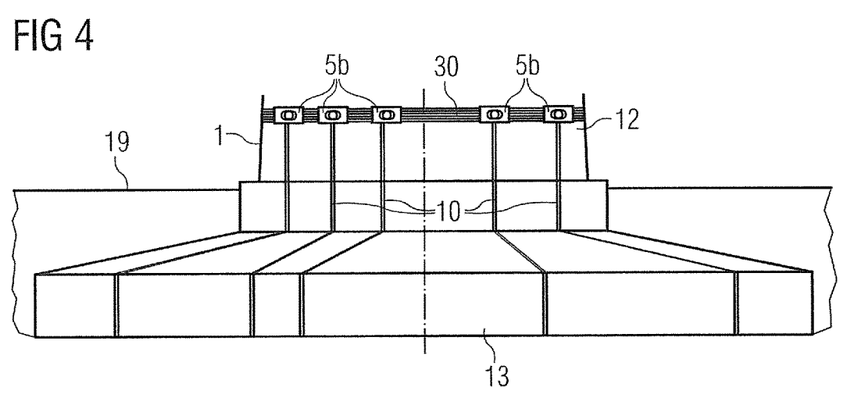
FIG. 4 shows a schematic diagram of the base of a tower constructed in the method according to the invention.

FIG. 4 shows a schematic diagram of the base of a tower 1 constructed in the method according to the invention. Here, a major lightning protection ring 30 runs around a lower region 12 of the tower 1. This major LP ring 30 is connected by robust mechanical clamps 5b—electrically conducting—to a plurality of earthing cables 10. The major LP ring 30 is constructed by six rounds of the same kind of cable as is used for the earthing cables 10. The earthing cables 10 lead below ground level 19 to a ground terminal which can be incorporated in the tower foundation 13.

The top of tower 1 is constructed in the method according to the invention. Here, tower is a wind turbine tower 1, and a yaw ring 6 is used to mount a nacelle housing (not shown). Yaw ring bolts 6a are used as fasteners 6a. Since these are also electrically conducting, the bolts 6a are clamped by steel clamps 5c to earthing cables in the tower wall 11. The yaw ring itself can be connected electrically, for example using a brush, to a lightning conductor of the nacelle, hub and blades. In this way, a lightning strike to the upper extremities of a wind turbine can be directed at several points into the lightning protection system embedded in the concrete tower wall 11.

Figure 5:
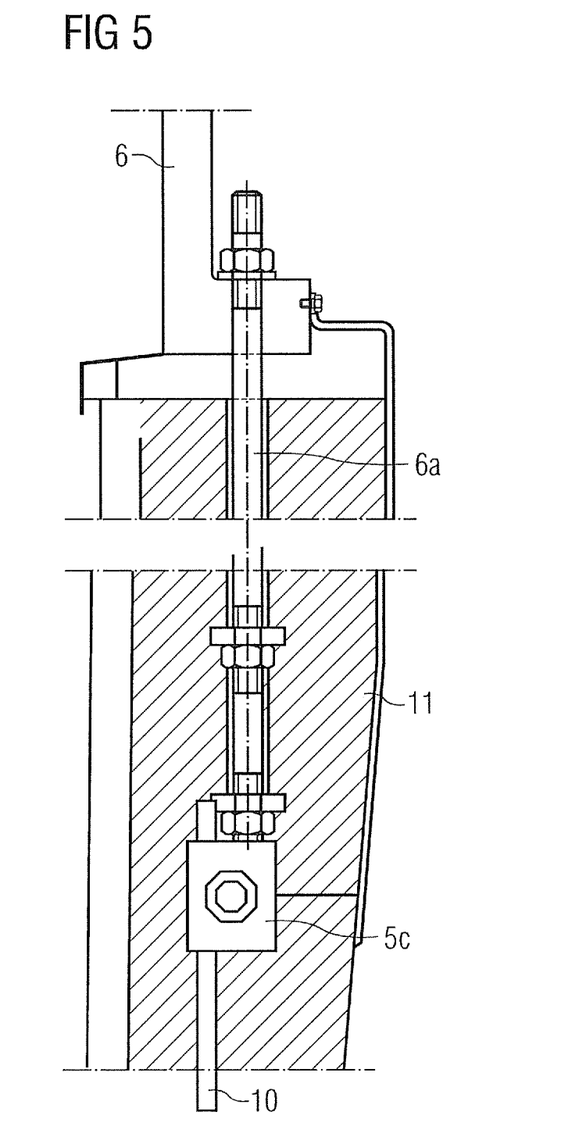
FIG. 5 is a simplified representation of part of a climbing rod for use in a lightning protection system according to the invention.

FIG. 5 is a simplified representation of part of a climbing rod 2 made of separate sections 2a, 2b, which are joined together during construction of a tower. The diagram shows an electrical connection 5d connecting the two sections 2a, 2b. This can be a steel plate 5d welded into place, or a steel band 5d clamped into place using appropriate clamps.

Figure 6:
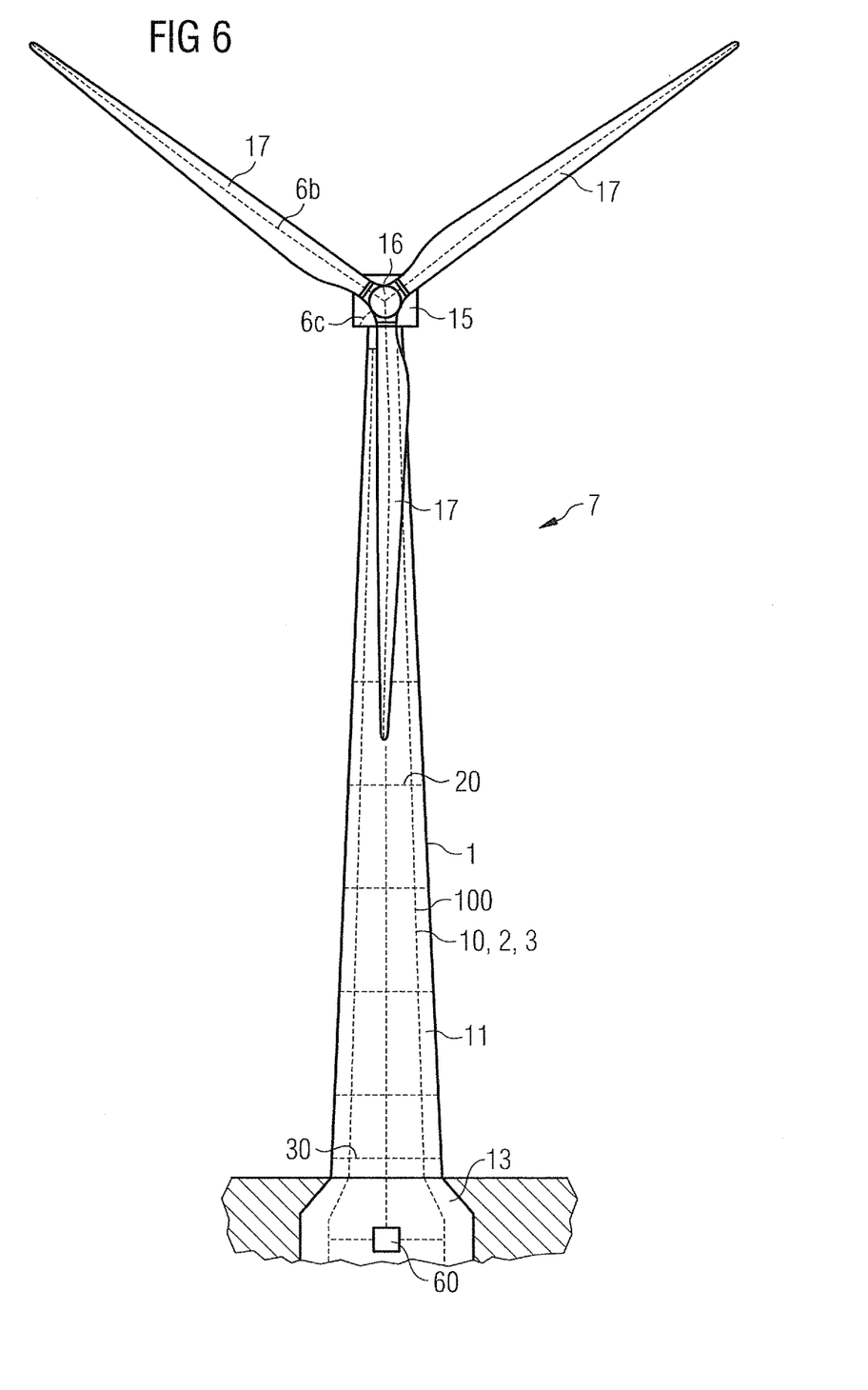
FIG. 6 shows a schematic representation of a wind turbine incorporating a lightning protection system according to a further embodiment of the invention.

FIG. 6 shows a schematic representation of a wind turbine incorporating a lightning protection system 100 according to the invention. The wind turbine has a nacelle housing 15 to which are attached a hub 16 and a number of blades 17. The nacelle 15 is mounted on the top of a tower 1, constructed using the method according to the invention, by means of a yaw ring and yaw ring bolts. Lightning conductors 6b, 6c direct a lightning hit along the outside of these elements and, via the yaw ring bolts, a yaw ring and brushes (not shown in the diagram) into the lightning protection system 100 in the tower wall 11. The lightning protection system 100 is collectively indicated by dotted lines which represent, in simplified faun, the earthing cables 10, climbing rods 2, tendons 3 and horizontal LP rings 20, 30. In this way, the high currents arising in a lightning strike are rapidly and evenly directed into a ground terminal 60.

Although the present invention has been disclosed in the form of preferred embodiments and variations thereon, it will be understood that numerous additional modifications and variations could be made thereto without departing from the scope of the invention. Evidently, the core idea of the invention, namely to use the structural elements of a reinforced concrete structure in a lightning protection system, can be used to good effect in any appropriate concrete construction in which the walls of the structure are made of cast concrete.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A lightning protection system for a tower, which tower comprises a reinforced concrete tower wall in which a plurality of electrically conductive structural reinforcing elements are embedded during construction,
   wherein the lightning protection system comprises a plurality of the structural reinforcing elements connected in an electrically conductive manner with each other and with a ground terminal and a plurality of first lightning conductors embedded in the tower wall during construction and electrically connected to the plurality of structural reinforcing elements and to the ground terminal;
   wherein a second lightning conductor comprises a horizontal ring embedded in the tower wall, and wherein the second lightning conductor is electrically connected to at least one structural reinforcing element and at least one of the plurality of first lightning conductors; and
   wherein a plurality of bands provides electrical connections for each bundle around the tower, wherein each bundle comprises of the at least one of the plurality of first lightning conductors, the plurality of structural reinforcing elements and the ground terminal.

2. The lightning protection system according to claim 1, wherein the at least one of the plurality of first lightning conductors is arranged adjacent to an essentially vertical structural reinforcing element and is electrically connected to the structural reinforcing element, which structural reinforcing element comprises a climbing rod and/or a post-tensioning cable.

3. The lightning protection system according to claim 1, wherein the second lightning conductor is embedded in a lower region of the tower wall and connected to the ground terminal in a foundation of the tower.

4. The lightning protection system according to claim 1, wherein a structural reinforcing element comprises a radial rebar embedded essentially radially in the tower wall adjacent to a number of the plurality of first lightning conductors, which radial rebar is electrically connected to the at least one of the plurality of first lightning conductors, a second lightning conductor and an essentially vertical structural reinforcing element.

5. The lightning protection system according to claim 1, wherein the at least one of the plurality of first lightning conductors comprises an earthing cable which is a continuous cable extending at least from the base of the tower to the top of the tower.

6. The lightning protection system according to claim 1, for embedding in a reinforced concrete tower wall of a wind turbine, wherein the concrete tower wall is cast in-situ using a climbing platform and supports a nacelle housing, a hub and a plurality of blades.

7. The lightning protection system according to claim 6, further comprising:
   a connection device for electrically connecting the at least one of the plurality of first lightning conductors of the lightning protection system in the tower wall to a further lightning conductor of the nacelle housing, the hub and the blades.

8. The lightning protection system according to claim 1, wherein a band of the plurality of bands is wrapped around one of the plurality of structural reinforcing elements and an earthing cable.

9. A method of incorporating a lightning protection system in a concrete tower constructed in-situ in one piece, comprising:
   mounting climbing rods to a currently uppermost level of the tower;
   assembling a casting form to enclose the climbing rods;
   placing additional electrically conductive structural reinforcing elements in the casting form;
   placing a number of first lightning conductors in the casting form and electrically connecting the first lightning conductors to the structural reinforcing elements in the casting form;
   placing second horizontal ring lightning conductors in the casting form and electrically connecting the second lightning conductors to the structural reinforcing element and the number of first lightning conductors;
   electrically connecting the structural reinforcing elements to a ground terminal; wherein a plurality of bands provides electrical connections for each bundle around the tower, wherein each bundle comprises at least one of the first lighting conductors, the plurality of structural reinforcing elements and the ground terminal;
   pouring concrete into the casting form to embed the structural reinforcing elements.

10. The method according to claim 9, wherein an electrical connection between one of the number of first lightning conductors and a climbing rod is made by welding the one of the number of first lightning conductors to the climbing rod and/or by mechanically clamping the one of the number of first lightning conductors to the climbing rod by means of a clamping element.

11. The method according to claim 9, wherein a climbing rod comprises a plurality of co-linear climbing rod sections, wherein a pair of co-linear climbing rod sections is connected by means of an electrical connection.

12. The method according to claim 9, wherein a band of the plurality of bands is wrapped around one of the plurality of structural reinforcing elements and an earthing cable.

13. A wind turbine, comprising:
   a lightning protection system for a tower of the wind turbine, which tower comprises a reinforced concrete tower wall in which a plurality of electrically conductive structural reinforcing elements are embedded during construction,
   wherein the lightning protection system comprises a plurality of the structural reinforcing elements connected in an electrically conductive manner with each other and with a ground terminal;
   a plurality of first lightning conductors embedded in the tower wall during construction and electrically connected to the plurality of structural reinforcing elements and to the ground terminal;

a second lightning conductor comprises a horizontal ring embedded in the tower wall, and wherein the second lightning conductor is electrically connected to at least one structural reinforcing element and at least one of the plurality of first lightning conductors; and wherein a plurality of bands provides electrical connections for each bundle around the tower, wherein each bundle comprises at least one of the plurality of first lightning conductors, the plurality of structural reinforcing elements and the ground terminal.

14. The wind turbine according to claim 13, wherein one of the plurality of first lightning conductors is arranged adjacent to an essentially vertical structural reinforcing element and is electrically connected to the structural reinforcing element, which structural reinforcing element comprises a climbing rod and/or a post-tensioning cable.

15. The wind turbine according to claim 13, wherein the second lightning conductor is embedded in a lower region of the tower wall and connected to the ground terminal in a foundation of the tower.

16. The wind turbine according to claim 13, wherein a structural reinforcing element comprises a radial rebar embedded essentially radially in the tower wall adjacent to the plurality of first lightning conductors, which radial rebar is electrically connected to one of the plurality of first lightning conductors, a second lightning conductor and an essentially vertical structural reinforcing element.

17. The wind turbine according to claim 13, wherein a first one of the plurality of first lightning conductors comprises an earthing cable which is a continuous cable extending at least from the base of the tower to the top of the tower.

18. The wind turbine according to claim 13, wherein a band of the plurality of bands is wrapped around one of the plurality of structural reinforcing elements and the ground terminal.

* * * * *